(12) United States Patent
Borlick et al.

(10) Patent No.: US 10,445,497 B2
(45) Date of Patent: *Oct. 15, 2019

(54) OFFLOADING PROCESSING OF WRITES TO DETERMINE MALICIOUS DATA FROM A FIRST STORAGE SYSTEM TO A SECOND STORAGE SYSTEM

(71) Applicant: International Business Machines Corporation, Armonk, NY (US)

(72) Inventors: Matthew G. Borlick, Tucson, AZ (US); Lokesh M. Gupta, Tucson, AZ (US); Carol S. Mellgren, Tucson, AZ (US); John G. Thompson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 292 days.

This patent is subject to a terminal disclaimer.

(21) Appl. No.: 15/586,039

(22) Filed: May 3, 2017

(65) Prior Publication Data
US 2018/0322281 A1    Nov. 8, 2018

(51) Int. Cl.
*G06F 21/60* (2013.01)
*G06F 21/55* (2013.01)
(Continued)

(52) U.S. Cl.
CPC ........ *G06F 21/554* (2013.01); *G06F 12/0888* (2013.01); *G06F 21/562* (2013.01);
(Continued)

(58) Field of Classification Search
CPC ........... G06F 21/56; G06F 21/60; G06F 21/64
See application file for complete search history.

(56) References Cited

U.S. PATENT DOCUMENTS 6,405,318 B1    6/2002 Rowland
7,464,246 B2    12/2008 Gill et al.
(Continued)

OTHER PUBLICATIONS

Notice of Allowance, dated Nov. 20, 2018, for U.S. Appl. No. 15/482,530 (18.710) filed Apr. 7, 2017, invented by Matthew G. Borlick, Total 43 pages.

(Continued)

*Primary Examiner* — Izunna Okeke
(74) *Attorney, Agent, or Firm* — David W. Victor; Konrad, Raynes, Davda and Victor LLP

(57) ABSTRACT

Provided are a computer program product, system, and method for offloading processing of writes to determine malicious data from a first storage system to a second storage system. Write data for a first storage is cached in a first cache in the first storage system and copied to a second cache in the second storage system. The second storage system determines whether the copy of the write data comprises random data according to a randomness criteria. The second storage system returns a message to the first storage system indicating that the write data comprises malicious data if random or not malicious data if not random. The first storage system destages the write data in the first cache if the message indicates not malicious data or processes the write data in the first cache as malicious data if the message indicates malicious data.

22 Claims, 6 Drawing Sheets

(51) Int. Cl.
  *G06F 12/0888* (2016.01)
  *G06F 21/56* (2013.01)
(52) U.S. Cl.
  CPC .. *G06F 2212/1052* (2013.01); *G06F 2212/60* (2013.01); *G06F 2221/034* (2013.01)

(56) References Cited

U.S. PATENT DOCUMENTS

| | | | |
|---|---|---|---|
| 7,962,959 | B1 | 6/2011 | Batenin |
| 8,532,610 | B2 | 9/2013 | Manning Cassell et al. |
| 9,292,687 | B2 | 3/2016 | Thure et al. |
| 9,317,686 | B1 | 4/2016 | Ye et al. |
| 9,319,423 | B2 | 4/2016 | Jover et al. |
| 9,734,337 | B1 | 8/2017 | Patton et al. |
| 2003/0159090 | A1* | 8/2003 | Wray ............... G06F 21/56 714/38.1 |
| 2005/0022093 | A1* | 1/2005 | Murakoshi ......... G06F 11/1004 714/758 |
| 2014/0237596 | A1 | 8/2014 | Grytsan et al. |
| 2014/0310800 | A1 | 10/2014 | Kabra et al. |
| 2016/0275294 | A1 | 9/2016 | Irvine |
| 2017/0208092 | A1 | 7/2017 | Ochse |
| 2018/0007074 | A1 | 1/2018 | Kune et al. |
| 2018/0018456 | A1 | 1/2018 | Chen et al. |

OTHER PUBLICATIONS

Notice of Allowance, dated Dec. 28, 2018, pp. 33 for U.S. Appl. No. 15/585,997 (18.709).
R. Gunasekaran et al. "Real-Time System Log Monitoring/Analytics Framework" dated 2011, Proceedings of the Characterizing Applications for Heterogeneous Exascale Systems (CACHES'11), Total 9 pages.
R. Gunasekaran et al. "Characterizing Application Runtime Behavior from System Logs and Metrics Raghul" dated 2011, Proceedings of the Characterizing Applications for Heterogeneous Exascale Systems (CACHES'11) Total 7 pages.
Kharraz et al. "Cutting the Gordian Knot: A Look Under the Hood of Ransomware Attacks" dated 2015, International Conference on Detection of Intrusions and Malware, and Vulnerability Assessment. Springer International Publishing, Total 20 pages.
R. Loui, et al., "Digital Flight Plans for Server Access Control: Restricting anomalous activity with path-based declarations of intentions", University of Illinois, Springfield, date not available, Total 6 pages.
E. Marilly et al. "Alarm correlation for complex telecommunication networks using neural networks and signal processing." dated 2002, IP Operations and Management, 2002 IEEE Workshop on. IEEE, Total 5 pages.
Mbol et al., "An Efficient Approach to Detect Torrentlocker Ransomware in Computer Systems." dated 2016, International Conference on Cryptology and Network Security. Springer International Publishing, Total 10 pages.
A. Oliner et al., "Alert detection in system logs." dated 2008, Eighth IEEE International Conference on Data Mining. EEE, Total 6 pages.
Scaife et al. "CryptoLock (and Drop It): Stopping Ransomware Attacks on User Data" dated 2016, Distributed Computing Systems (ICDCS), 2016 IEEE 36th International Conference on. IEEE, Total 10 pages.
Song et al., "The Effective Ransomware Prevention Technique Using Process Monitoring on Android Platform." dated 2016, Mobile Information Systems 2016, Total 10 pages.
Sgandurra et al. "Automated Dynamic Analysis of Ransomware: Benefits, Limitations and Use for Detection." dated 2016, Department of Computing, Total 12 pages.
"Antivirus software", Wikipedia, [online][retrieved Mar. 26, 2017] https://en.wikipedia.org/wiki/Antivirus_software, Total 10 pages.
U.S. Patent, dated May 3, 2017 for U.S. Appl. No. 15/585,997 (App. 18.709), invented by Matthew Borlick et al., filed May 3, 2017, Total 33 pages.
U.S. Patent, dated Apr. 7, 2017 for U.S. Appl. No. 15/482,530 (18.710), invented by Matthew Borlick et al., filed Apr. 7, 2017, Total 34 pages.
List of Related Applications, pp. 2, dated May 3, 2017.
Ljubuncic, Problem-solving in High Performance Computing: A Situational Awareness Approach with Linux. Morgan Kaufmann, 2015.

* cited by examiner

I/O Activity Sample

Historical I/O Activity

Data Entity Access Information

Cache Entry

OFFLOADING PROCESSING OF WRITES TO DETERMINE MALICIOUS DATA FROM A FIRST STORAGE SYSTEM TO A SECOND STORAGE SYSTEM

BACKGROUND OF THE INVENTION

1. Field of the Invention

The present invention relates to a computer program product, system, and method for offloading processing of writes to determine malicious data from a first storage system to a second storage system.

2. Description of the Related Art

Anti-malware software, also known as anti-virus software, is used to detect, prevent and remove malicious software, such as malicious browser helper objects (BHOs), browser hijackers, ransomware, key loggers, backdoors, rootkits, Trojan horses, worms, malicious LSPs, dialers, fraud tools, adware and spyware. Typically when there is a possible data breach from malicious software, access to the data subject to the breach is blocked until the security threat is resolved, so as to avoid any alteration of data by the suspicious software. One type of malicious software known as ransomware encrypts user data, and then the operator of the ransomware blackmails the victim of the attack requiring payment for the encryption key to use to decrypt their data.

There is a need in the art for improved techniques for detecting suspicious processes potentially having malware so that such processes can then be managed to prevent malevolent activity and compromising data.

SUMMARY

Provided are a computer program product, system, and method for offloading processing of writes to determine malicious data from a first storage system to a second storage system. Write data for a first storage is cached in a first cache in the first storage system. A copy of the write data in the first cache is copied to a second cache in the second storage system. A determination is made at the second storage system whether the copy of the write data in the second cache comprises random data according to a randomness criteria. The second storage system returns a message to the first storage system indicating that the write data in the first cache comprises malicious data in response to determining the write data comprises random data or does not comprise malicious data in response to determining the write data does not comprise random data. The first storage system destages the write data in the first cache to the first storage in response to the message indicating that the write data does not comprise malicious data. The first storage system processes the write data in the first cache as malicious data after determining from the message that the write data comprises malicious data.

With ransomware, user data is encrypted by a malicious process and then the encrypted data is written back to the user storage. The user is then blackmailed for the encryption key needed to decrypt their data. Described embodiments seek to prevent data encrypted by ransomware from being written to the storage. With described embodiments, a first storage system receiving data from hosts may offload processing to determine whether data is malicious, such as from ransomware, to a second storage system to determine whether data is random, because encrypted data typically comprises random data. In such case, upon determining write data in cache comprises random data, the second storage system sends a message to the first storage system to process the write data as malicious data. If the write data in the cache is not random data, then the second storage system sends a message indicating the write data is not malicious which allows the first storage system to write the write data to the storage because it would not be encrypted by ransomware if not random.

Further provided is a system comprising a first storage system in communication with a second storage system having a second cache and a second storage., comprising a processor, a cache, a first storage, and a computer readable storage medium having computer readable program code embodied therein executed by the processor to perform: caching write data for the first storage in the first cache in the first storage system; copying a copy of the write data in the first cache to the second cache in the second storage system; receiving, from the second storage system, a message indicating that the write data in the first cache comprises malicious data in response to the second storage system determining the copy of the write data comprises random data or does not comprise malicious data in response to determining the copy of the write data does not comprise random data; destaging the write data in the first cache to the first storage in response to the message indicating that the write data does not comprise malicious data; and processing the write data in the first cache as malicious data after determining from the message that the write data comprises malicious data.

In the above embodiment, the second storage system receives the copy of the write data to cache in a second cache and performs the processing to determine whether the copy of the write data comprises random data, and return a message to the first storage system whether the write data comprises malicious data based on this determination, such that the malicious data determination is offloaded to another storage system that is also handling the mirroring of the data from the first storage system to consolidate mirroring and malicious code checking in a separate second storage system.

In a further embodiment, the first storage system indicates that the write data has not been scanned when adding the write data to the first cache and indicates that the write data in the first cache was scanned and that the write data comprises malicious data in response to the message from the second storage system indicating that the write data comprises malicious data after determining the write data comprises random data according to the randomness criteria. The first storage system further indicates that the write data in the first cache was scanned and that the write data does not comprise malicious data in response to the message from the second storage system indicating that the write data does not comprise malicious data according to the randomness criteria.

In the above embodiments, by indicating the data as not scanned, the data will remain in cache and not be destaged to storage. Only after the data is scanned and confirmed as not random, and potentially encrypted by ransomware, may the data then be destaged as part of a normal destaging operation.

In a further embodiment, the first storage system selects write data from a plurality of write data instances in the first cache and determines whether the selected write data was scanned. The selected write data is destaged in response to determining that the write data has been scanned and that the write data does not comprise malicious data. The selected write data is processed as malicious data in response to determining that the write data was scanned and comprises malicious data.

With the above embodiment, data is not destaged until the write data is confirmed as scanned and random or not. In this way, the write data may be processed according to regular destaging operations, but not destaged if not yet scanned. Alternatively, the write data may be immediately scanned upon being placed in cache. Further, in the above embodiment, by indicating the data as not scanned, the data will remain in cache and not be written to storage. Only after the data is scanned and confirmed as not random, and potentially encrypted by ransomware, may the data then be destaged as part of a normal destaging operation.

Further provided is a system comprising a second storage system in communication with a first storage system having a first cache and a first storage, comprising. The second storage system includes a processor, a second cache, and a second storage, and a computer readable storage medium having computer readable program code embodied therein that when executed by the processor performs operations comprising: receiving from the first storage system a copy of write data in the first cache; caching the received copy of the write data in the second cache; determining whether the copy of the write data in the second cache comprises random data according to a randomness criteria; returning a message to the first storage system indicating that the write data in the first cache comprises malicious data in response to determining the copy of the write data comprises random data or does not comprise malicious data in response to determining the copy of the write data does not comprise random data, wherein the message causes the first storage system to destage the write data in the first cache to the first storage in response to the message indicating that the write data does not comprise malicious data and process the write data in the first cache as malicious data in response to the message indicating that the write data comprises malicious data.

In the above embodiment, the second storage system receives the copy of the write data to cache in a second cache and performs the processing to determine whether the copy of the write data comprises random data, and return a message to the first storage system whether the write data comprises malicious data based on this determination. In this way, the processing to determine whether the data is malicious is offloaded to another storage system that is also handling the mirroring of the data from the first storage system to consolidate mirroring and malicious code checking in a separate second storage system.

In a further embodiment, the randomness criteria comprises a compression ratio and the determining by the second storage system as to whether the copy of the write data in the second cache comprises random data comprises: compressing the copy of the write data to produce a compressed write data; and determining whether the compressed write data exceeds the compression ratio, wherein the write data is determined to comprise random data in response to determining that the compressed write data does not exceed the compression ratio and wherein the write data is determined to not comprise random data in response to determining that the compressed write data exceeds the compression ratio.

In the above embodiment, the determination of whether the data is random data and thus potentially ransomware is determined by compressing the data and determining whether the data actually compressed. Random data does not compress. Thus, a determination that the write data did not compress would determine that the write data comprises encrypted data, and thus potentially comprise ransomware.

In a further embodiment, the second storage system or the first storage system determines whether the write data in the first cache is from a suspicious process. The determining whether the copy of the write data comprises random data is performed in response to determining that the write data is from a suspicious process and the message indicates that the write data comprises malicious data in response to determining that the write data is from a suspicious process and the copy of the write data comprises random data. The message indicates the write data is not malicious in response to determining that the write data is not from a suspicious process or determining that the write data is from a suspicious process and the copy of the write data does not comprise random data.

With the above embodiment, only random data from a suspicious process is not destaged, whereas random write data from a process that is not suspicious may be destaged. This embodiment allows for random or encrypted data from a process that is not suspicious so as not to interfere with valid processes, and assumes a suspicious process writing random data comprises ransomware encrypting customer data. Further, with described embodiments a suspicious process writing data that is not random may be allowed to continue because the suspicious process is not encrypting data and not likely ransomware, and because the suspicious process may in fact be legitimate, it may be allowed to continue because it is not encrypting the data for ransomware purposes.

In a further embodiment, the write data is determined to be from a suspicious process in response to determining at least one of: that the I/O activity rate of a process that wrote the write data exceeds a historical I/O activity rate by a I/O activity rate threshold; that a difference of a timestamp of the write data and the timestamp of when a data entity including the write data in the first storage was last written exceeds a time threshold; and that write data is directed to trap data.

With the above embodiment, the determiners of whether a process is suspicious may consider whether the process is engaging in an unusual amount of I/O activity, which is common for a malicious process, especially ransomware, that is trying to encrypt the entire user storage space. Another factor may be whether the process is accessing data that has not been accessed in a substantial amount of time, because malicious processes tend to access all areas of the disk, including data areas that have not been accessed in a long time. Further, a process accessing trap data that no other legitimate process would be programmed to access is further indicative of a suspicious process. These determiners may be considered separately or together before determining a process is suspicious.

DETAILED DESCRIPTION

Anti-malware software identifies security threats and potential malicious processes, and then may block access to data subject to the security threat until the security threat is resolved. Described embodiments provide techniques to offload the processing and determination of whether write data to a first storage system being stored in a first cache at the first storage system comprises random data to a second storage system. A determination that write data comprises random data indicates that the write data is encrypted data by ransomware to replace user data with the user data encrypted by the ransomware. A further determination may be made as to whether the write data in the cache is from a suspicious process, such that write data from a suspicious process determined to comprise random data would not be destaged from the cache to the storage under the assumption the suspicious process comprises ransomware encrypting the data. Described embodiments allow for the processing of the determination of whether the write data comprises random data at a second storage system to not cause delays in processing of writes at the first storage system, which may comprise the primary production storage for hosts and applications.

Figure 1:
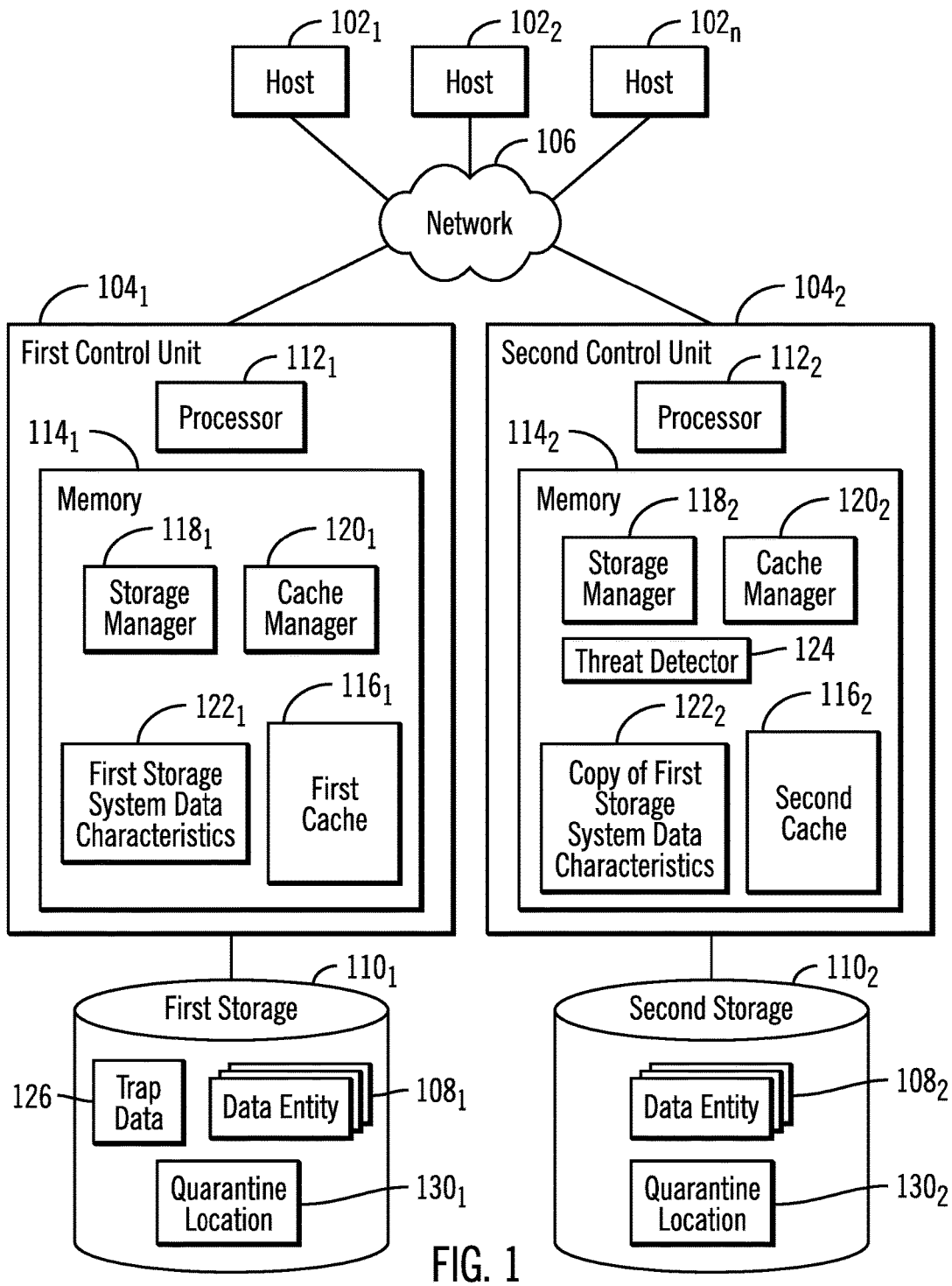
FIG. 1 illustrates an embodiment of a computing environment.

FIG. 1 illustrates an embodiment of a computing environment. A plurality of hosts $102_1$, $102_2$... $102_n$, may submit Input/Output (I/O) requests to a first storage control unit $104_1$ over a network 106 to access data entities $108_1$ (e.g., Volumes, Logical Unit Numbers, Logical Devices, Logical Subsystems, data sets, extents of data, data objects, databases, etc.) in a first storage $110_1$. The first storage control unit $104_1$ may have the primary production volumes and data. The first control unit $104_1$ mirrors data entities $108_1$ in the first storage $110_1$ to a second control unit $104_2$ to store in the second storage $110_2$. The term "first storage system" and "second storage system" as used herein may refer to a control unit $104_1$ and $104_2$ and/or the connected storage $110_1$ and $110_2$, respectively.

The first $104_1$ and second $104_2$ control units each include one or more processors $112_1$, $112_2$ and a memory $114_1$, $114_2$ including a first cache $116_1$ and second cache $116_2$ to cache data for the first storage $110_1$ and second storage $110_2$, respectively. The processors $112_1$ and $112_2$ may each comprise a separate central processing unit (CPU), one or a group of multiple cores on a single CPU, or a group of processing resources on one or more CPUs. The first cache $116_1$ buffers data transferred between the hosts $102_1$, $102_2$... $102_n$ and data entities $108_1$ in the first storage $110_1$ and the second cache $116_2$ buffers data being mirrored from the first control unit $104_1$, including write data just written and data being copied in the background from the first storage $110_1$ to the second storage $110_2$.

Each memory $114_1$, $114_2$ includes a storage manager $118_1$, $118_2$ for managing the transfer of tracks to and from the control unit $104_1$, $104_2$ and a cache manager $120_1$, $120_2$ that manages the caching of data in the first cache $116_1$ and second cache $116_2$. The storage managers $118_1$, $118_2$ may further manage the mirroring of data from the first control unit $104_1$ to the second control unit $104_2$. A data entity $108_1$, $108_2$ may comprise any unit of data configured in the storage $110_1$, $110_2$, such as a track, Logical Block Address (LBA), storage cell, group of cells (e.g., column, row or array of cells), sector, segment, etc., which may be part of a larger grouping of tracks, such as a volume, logical device, etc.

The first control unit $104_1$ further gathers first storage system data characteristics $122_1$ comprising information on data in the data entities $108_1$. The first control unit $104_1$ may periodically copy the first storage system data characteristics $122_1$ to the second control unit $104_2$ to store as a copy of first storage system data characteristics $122_2$, which the second control unit $104_2$ uses to determine whether write data mirrored from the first cache $116_1$ to the second cache $116_2$ was written by a suspicious process comprising a process determined to possibly be malevolent/malicious.

The second memory $114_2$ further includes a threat detector 124 executed in the second control unit $104_2$ to detect suspicious processes that potentially have malicious code, such as a virus, ransomware, etc. based on the copy of the first storage system data characteristics $122_2$. The threat detector 124 may further determine whether a copy of write data in the second cache $116_2$, copied from the first cache $116_1$, comprises random data, which indicates the write data may comprise encrypted data from ransomware.

Figure 2:
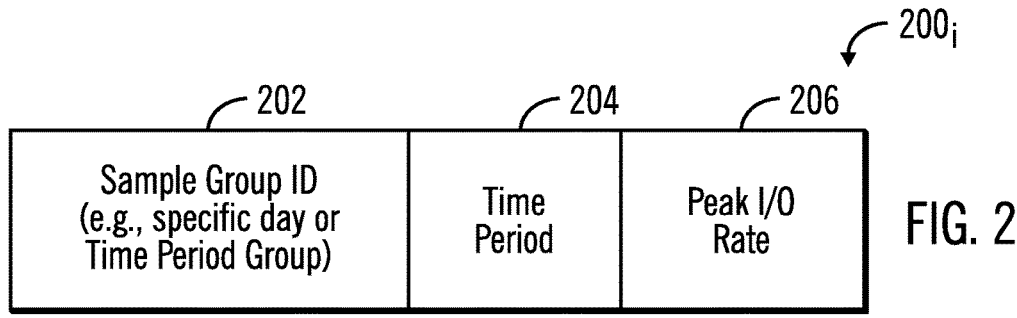
FIG. 2 illustrates an embodiment of an Input/Output (I/O) activity sample.
Figure 3:
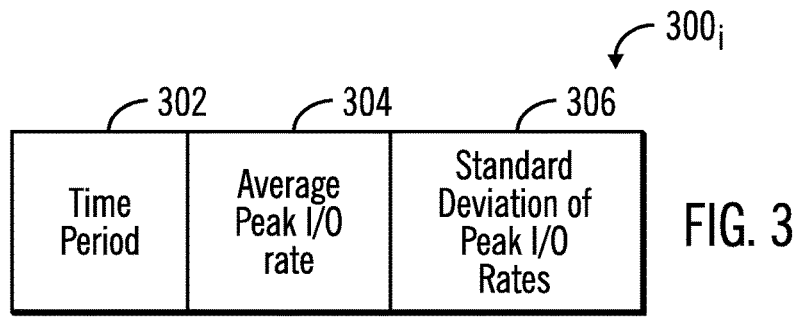
FIG. 3 illustrates an embodiment of historical I/O activity information.
Figure 4:
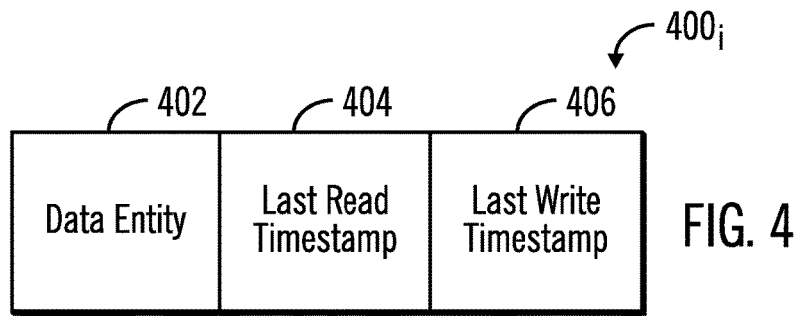
FIG. 4 illustrates an embodiment of data entity access information.

The first storage system data characteristics $122_1$ and the copy $122_2$ may include historical Input/Output (I/O) activity 300 shown in FIG. 3 and/or data entity access information 400 shown in FIG. 4. The historical I/O activity 300 is generated from I/O activity samples 200, shown in FIG. 2, comprising measurements of I/O activity toward the data entities $108_1$ (e.g., a data set, volume, grouping of tracks or blocks, etc.) at different time periods, such as peak I/O rates at different time periods, e.g., a portion of a larger time period (e.g., a segment of a day). The I/O activity samples 200 are measured at different sample time periods of a lager time period. For instance, the sample time periods may comprise portions of a larger time period comprising a day, such as portions of a day, daytime versus nighttime. Alternatively, the sampled time periods may comprise days measured for a larger time period such as a week or month, or the sampled time periods can comprise minute segments of an hour, etc. The samples 200 provide data for the sampled time periods over multiple instances of the larger time periods.

The first storage $110_1$ may further include trap data 126 that valid users or the first control unit $104_1$ would not access. If write data in the first cache $116_1$ is directed toward the trap data 126, such as specific storage $110_1$ addresses having the trap data 126, then the process accessing such trap data 126 comprises a suspicious process potentially comprising malicious code, because valid processes and users would not access the trap data 126. It may be assumed that ransomware or other malevolent code would access the trap data 126 as part of operations to steal or encrypt all data in the storage $110_1$.

The first storage $110_1$ may also include a quarantine location $130_1$ to store write data deemed to comprise malevolent data, such as write data encrypted by ransomware. The write data stored in the quarantine location 130 may be inspected for further analysis and action. The second storage $110_2$ may also include a quarantine location $130_2$ to quarantine the copy of the write data from the first cache $116_1$ at the second storage system, so that malicious write data is not destaged to the second storage $110_2$, maintaining the integrity of the backup copy at the second storage $110_2$.

The storage manager $118_1$, $118_2$, cache manager $120_1$, $120_2$, and threat detector 124 are shown in FIG. 1 as program code loaded into the respective memory $114_1$, $114_2$ and executed by one or more of the processors $112_1$, $112_2$. Alternatively, some or all of the functions may be implemented as microcode or firmware in hardware devices in the control units $104_1$, $104_2$, such as in Application Specific Integrated Circuits (ASICs).

The first storage $110_1$ and second storage $110_2$ may comprise one or more storage devices known in the art, such as a solid state storage device (SSD) comprised of solid state electronics, NAND storage cells, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The first memory $114_1$ and second memory $114_2$ may comprise a suitable volatile or non-volatile memory devices, including those described above.

The network 106 may comprise a Storage Area Network (SAN), a Local Area Network (LAN), a Wide Area Network (WAN), the Internet, and Intranet, etc. Alternatively, the hosts $102_1$, $102_2$ . . . $102_n$ may connect to the storage controller 104 over a bus interface, such as a Peripheral Component Interconnect (PCI) bus interface and other interfaces known in the art.

FIG. 2 illustrates an embodiment of an instance of an I/O activity sample 200, comprising a sample group identifier (ID) 202, such as an identifier of a larger time period during which the samples are measured at the first control unit $104_1$, such as a specified day, week, month, etc.; a time period 204 for which the sample was measured, where there may be multiple time periods 204 within a larger sample group or larger time period, such as portions of a day within a day, days within a week, etc.; and a peak I/O rate 206 comprising the highest I/O rate that occurred during the time period 204 at the first control unit $104_1$, such as measured as a data transfer rate.

FIG. 3 illustrates an embodiment of an instance of historical I/O activity $300_1$ for a time period at the first control unit $104_1$ calculated from the I/O activity samples $200_1$ for the time period, and includes a time period 302 of the larger period for which the I/O activity samples 200 are gathered at the first control unit $104_1$; an average peak I/O rate 304 calculated during the time period 302 from the samples $200_1$ for that time period 302 at the first control unit $104_1$; and a standard deviation 306 of the peak I/O rates in the I/O activity samples $200_1$ for the time period 302. There may comprise different historical I/O activity, such as different average peak I/O rates 304 and standard deviations 306, for different time periods measured for the larger time period at the first control unit $104_1$.

FIG. 4 illustrates an embodiment of an instance of data entity access information $400_1$ for a specified data entity 402 at the first control unit $104_1$, such as a logical volume, data set, group of tracks or blocks, etc., and indicates a last read timestamp 404 indicating a time of a last read to the data entity 402 at the first control unit $104_1$ and a last write timestamp 406 indicating a time of a last write to the data entity 402 at the first control unit $104_1$.

Figure 5:
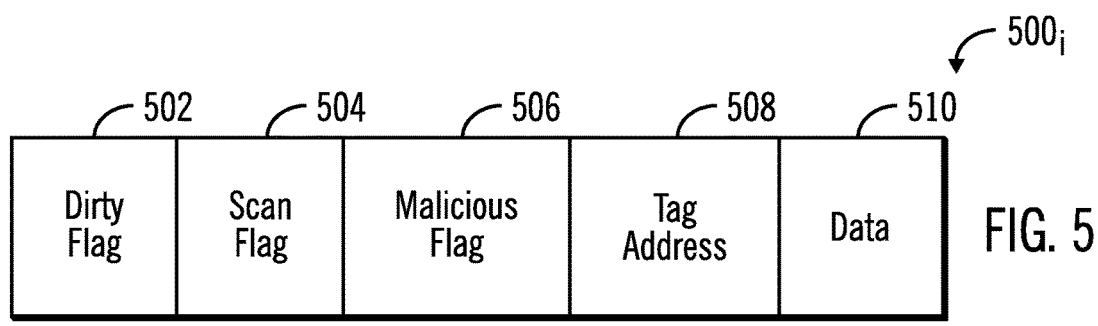
FIG. 5 illustrates an embodiment of a cache entry of data in the cache.

FIG. 5 illustrates an embodiment of a cache entry $500_1$ included in the first cache $116_1$ and the second cache $116_2$, and includes a dirty flag 502 indicating whether the data comprises modified data; a scan flag 504 indicating whether the write data in the cache entry $500_1$ has been scanned to determine whether the write data comprises encrypted data; a malicious flag 506 indicating whether the write data has been determined to comprise malicious data, which comprises data written by a suspicious process that is random data; a tag address 508 where the write data is stored in the storage $110_1$, $110_2$; and the data 510 for the address 508.

Figures 6, 7:
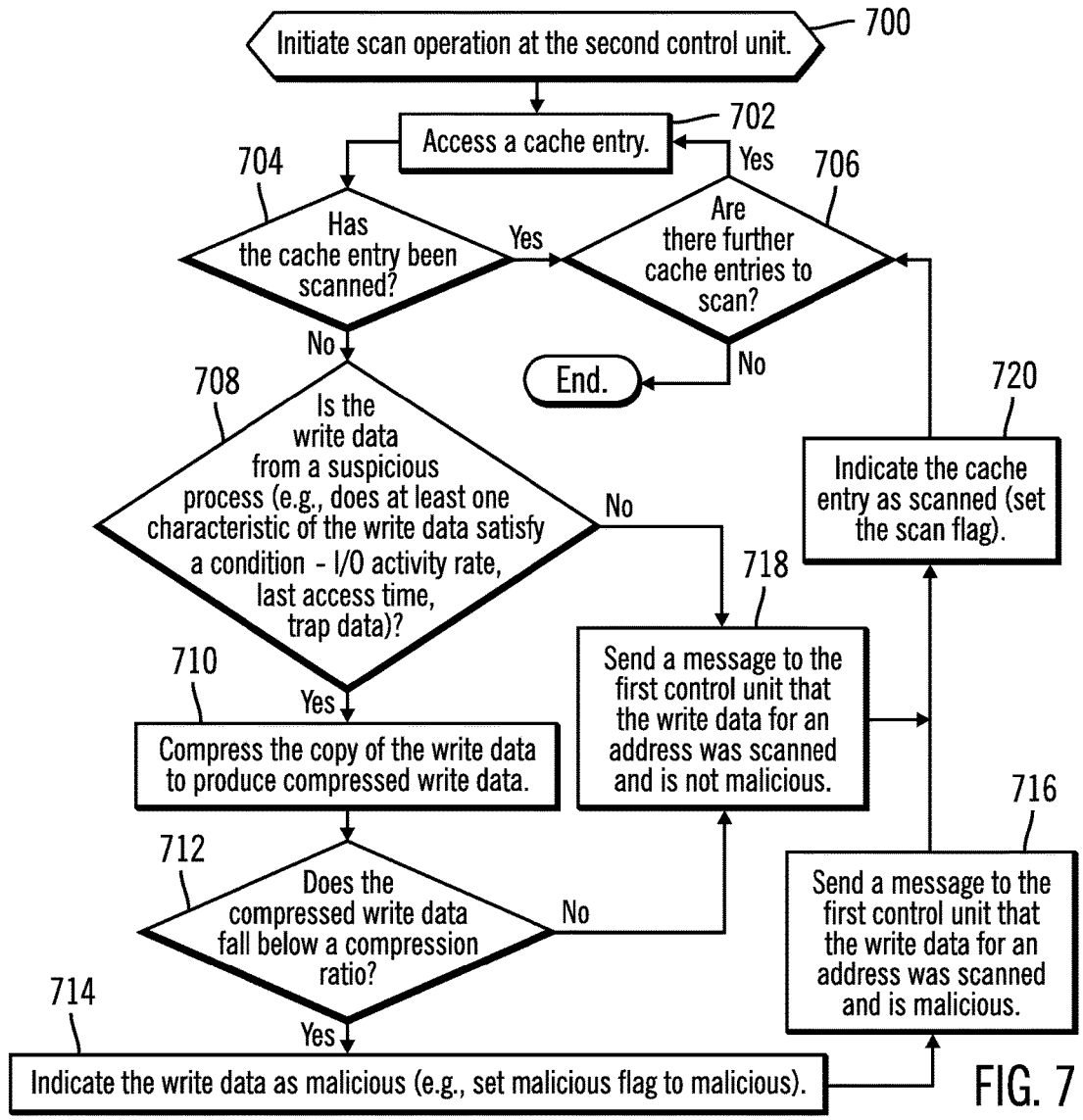
FIG. 6 illustrates an embodiment of operations to cache write data and mirror to a second storage system.
FIG. 7 illustrates an embodiment of operations to scan for random write data.

FIG. 6 illustrates an embodiment of operations performed by the cache manager $120_1$ in the first control unit $104_1$ to process received write data from one of the hosts $102_1$, $102_2$ . . . $102_n$. Upon receiving (at block 600) the write data, the cache manager $120_1$ creates (at block 602) a cache entry $500_1$ for the write data in the first cache $116_1$ indicating the entry is for dirty data in dirty flag 502, the data has not been scanned in the scan flag 504, and that the data does not comprise malicious data in the malicious flag 506. The tag address 508 and write data 510 are also included. The storage manager $118_1$ than copies the write data 510 in the first cache $116_1$ to the second control unit $104_2$ to store in the second cache $116_2$ in a cache entry $500_1$, with the scan flag 504 and malicious flag 506 set to an off state.

FIG. 7 illustrates an embodiment of operations performed by the threat detector 124 or other component in the second control unit $104_2$, to determine whether the copy of the write data in the second cache $116_2$ comprises malicious or malevolent data, such as encrypted data written by ransomware. A cache entry $500_i$ in the second cache $116_2$ is accessed (at block 702). If (at block 704) the cache entry $500_i$ has been scanned, as indicated in the scan flag 504, then if (at block 706) there are further cache entries to scan, then control proceeds back to block 702 to access a next cache entry $500_{i+1}$. Else, if there are no further cache entries to scan, then control ends. If (at block 704) the cache entry $500_i$ has not been scanned, then a determination is made (at block 708) as to whether the write data is from a suspicious process that potentially is comprised of malware. This may be determined by considering whether a characteristic of the write data, as indicated in the copy of first storage system data characteristics $122_2$, satisfies a condition indicating the write data is from a suspicious process. The determining whether the write data is from a suspicious process based on a characteristic of the data and a condition associated therewith may comprise at least one of determining whether an I/O activity rate of the process that wrote the write data exceeds a historical I/O activity rate by an I/O activity rate threshold, determining whether a difference of a timestamp of the write data and a timestamp of when a data entity including the storage address to write was last accessed exceeds a time threshold, and determining whether the write data is directed to trap data 126. The threat detector 124 in the second control unit $104_2$ makes these determinations based on the copy of the write data in the second cache $116_2$ and the copy of the first storage system data characteristics $122_2$.

Figure 9:
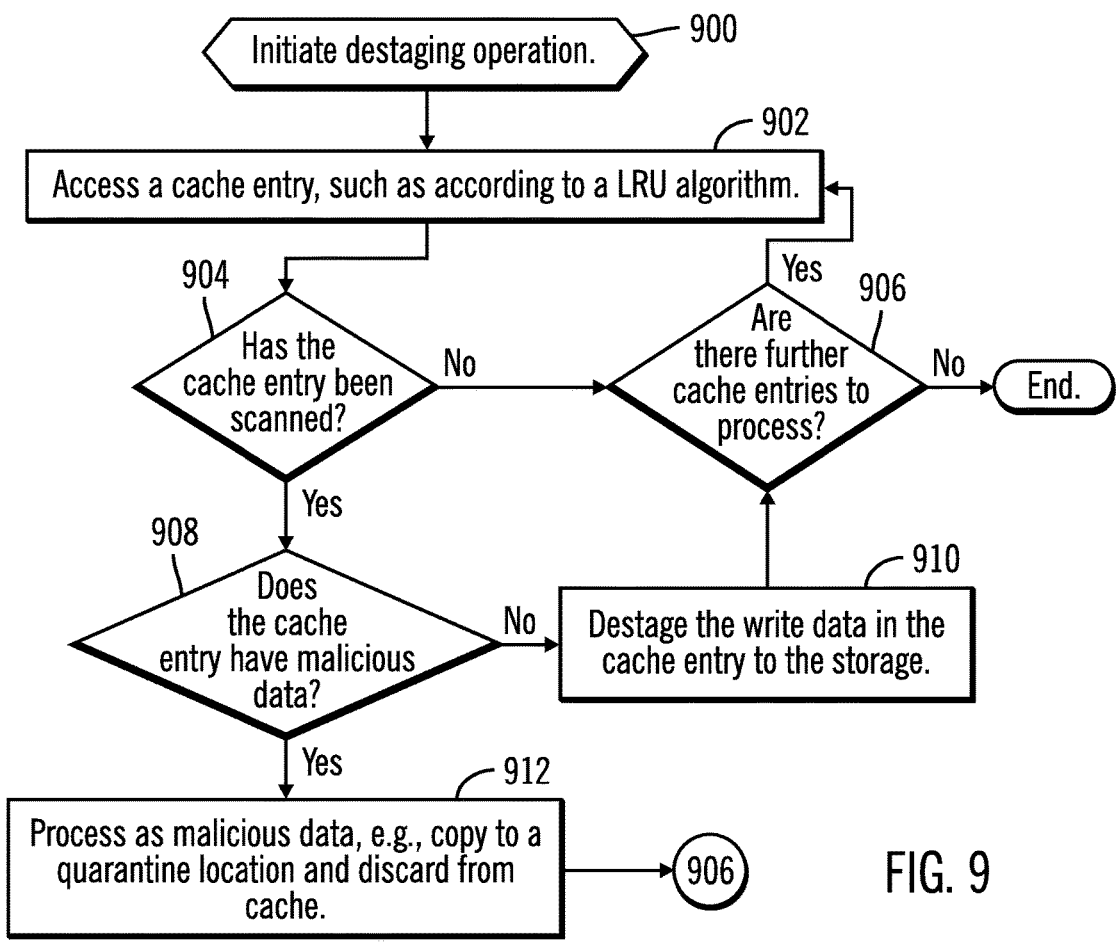
FIG. 9 illustrates an embodiment of operations to destage data.

If (at block 708) the write data is from a suspicious process, then the threat detector 124 determines whether the write data comprises random data by compressing (at block 710) the copy of the write data. If (at block 712) the compressed copy of the write data falls below a compression ratio, which indicates that the copy of the write data did not compress and is likely random data, which has the property of not compressing, then the copy of the write data is indicated (at block 714) as malicious data, such as by setting the malicious flag 506 to indicate malicious data. The threat detector 124 sends (at block 716) a message to the first control unit $104_1$ that the write data for the storage address was scanned and is malicious. At this point, the cache entry $500_1$ having the malicious random data may be moved to the quarantine location 130 or discarded. In the embodiment of FIG. 9, the cache entry $500_1$ having the write data may be later processed and discarded during a destage operation. If (at block 712) the write data did compress (from the no branch of block 712) or is not from a suspicious process (from the no branch of block 708), then the threat detector 124 sends (at block 718) a message to the first control unit $104_1$ that the write data for an address was scanned and is not malicious. From block 716 or 718, the threat detector 124 may indicate (at block 720) the cache entry $500_1$ in the second cache $116_2$ as scanned, such as by setting the scan flag 504 to indicate scanned, and control proceeds to block 706 to determine whether to scan further cache entries.

In FIG. 7, the randomness criteria used to determine whether the write data comprises random data is to compress the write data and determine whether the write data experienced compression because encrypted data, which is random, would not compress beyond a minimum compression ratio. In alternative embodiments, different techniques may be used to determine whether the write data is random and possible encrypted.

With the embodiment of FIG. 7, the copy of the write data in the second cache $116_2$ is scanned to determine if the process that generated the write data comprises a suspicious process, i.e., a process deemed likely to be malware, and whether the write data is random, indicating the write data comprises encrypted data encrypted by ransomware. With the embodiment of FIG. 7, if the data was written by a process not deemed to be a suspicious process, then the write data will be written to the first storage $110_1$ even if the data is random or compressed, because the process that encrypted the data is likely valid and not suspicious. Thus, in certain embodiment, malicious data may only be indicated if both the write data was written by a suspicious process and comprises random data.

FIG. 7 describes a scan operation that periodically scans multiple cache entries in the second cache $116_2$. In an alternative embodiment, the threat detector 124 may immediately scan the copy of the write data from the first control unit $104_1$ when it is placed in the second cache $116_2$ as part of the write processing. In this way, the scan operations at blocks 708, 710, 712, 714, 716, 718 in FIG. 7 may be performed when immediately adding the copy of the write data to the second cache $116_2$ as part of processing the mirrored write data. In such embodiments, there may be no scan flag 504 because the copy of the write data is immediately scanned to determine whether the write data is random upon being added to cache 116.

With the operations of FIG. 7, the first control unit $104_1$ offloads the scanning operations to the second control unit $104_2$ to determine whether write data in the first cache $116_1$ comprises encrypted data from a suspicious process, thus likely to be ransomware. This offloading of the scanning allows such security threats to be determined without burdening processing at the first control unit $104_1$ and not have the threat detection interfere and cause delays with the first control unit $104_1$ processing of I/O operations from the hosts $102_1, 102_2 \ldots 102_n$.

Figure 8:
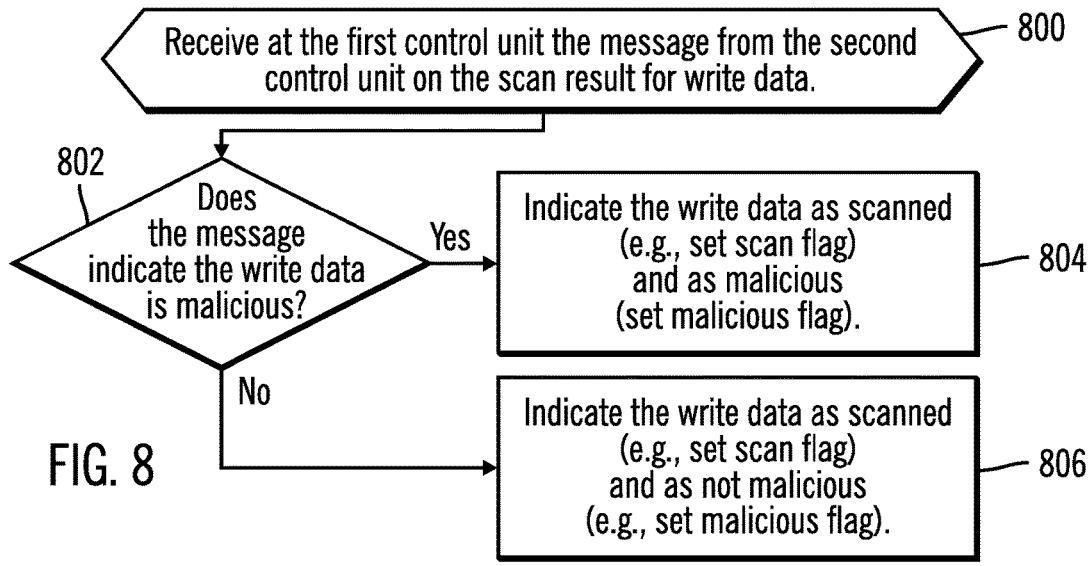
FIG. 8 illustrates an embodiment of operations at a first storage system to process a message from a second storage system indicating whether write data to the first storage system is malicious.

FIG. 8 illustrates an embodiment of operations performed by the storage manager $118_1$ or some other component at the first control unit $104_1$ to process the message from the second control unit $104_2$ indicating whether write data for a storage address copied to the second control unit $104_2$ comprises malicious data. If (at block 802) the message indicates write data as malicious, then the storage manager $118_1$ or cache manager $120_1$ indicates (at block 804) the write data in the first cache $116_1$ for which the message was directed as scanned, such as by setting the scan flag 504, and malicious, such as setting the malicious flag 506. If (at block 804) the message indicates write data as not malicious, then the storage manager $118_1$ or cache manager $120_1$ indicates (at block 806) the write data in the first cache $116_1$ for which the message was directed as scanned, such as by setting the scan flag 504, and not malicious, such as setting or not setting the malicious flag 506.

FIG. 9 illustrates an embodiment of operations performed by the cache manager $120_1$ or other component to destage write data 510 in cache entries $500_i$ in the first cache $116_1$ to the first storage $110_1$. Upon initiating (at block 900) a destage operation, the cache manager $120_1$ accesses (at block 902) a cache entry $500_i$, such as according to a lead recently used (LRU) algorithm. If (at block 904) the cache entry $500_i$ has not been scanned, such as indicated in the scan flag 504 for the cache entry $500_i$, then if (at block 906) there are further first cache $116_1$ entries to destage, control proceeds to block 902 to access a next cache entry $500_{i+1}$ in the first cache $116_1$. Otherwise, if there are no further cache entries to destage, such as reaching the end of the LRU list, then control ends.

If (at block 904) the cache entry $500_i$ has been scanned, such as indicated in the scan flag 504, then the cache manager $120_1$ determines (at block 908) whether the cache entry $500_i$ has malicious data, such as indicated in the malicious flag 506. If (at block 908) the cache entry $500_i$ does not have malicious data, then the write data for the cache entry $500_i$ is destaged (at block 910) from the first cache $116_1$ to the address 508 in the first storage $110_1$ and control proceeds to block 906 to determine whether to process another cache entry $500_{i+1}$ in the first cache $116_1$. If (at block 908) the cache entry $500_i$ does have malicious data, then the cache manager $120_1$ or some other component may process (at block 912) the write data as malicious data, such as ransomware, and discard and/or move the cache entry $500_1$ to the quarantine location 130. If (at block 908) the cache entry $500_i$ does not have malicious data, as indicated in the malicious flag 506, then the cache manager $120_1$ destages (at block 910) the write data 510 from in the cache entry $500_i$ in the first cache $116_1$ to the first storage $110_1$. After processing the cache entry $500_i$ control proceeds to block 906 to determine whether there are further cache entries $500_{i+1}$ to process, such as according to an LRU list.

With the embodiment of FIG. 9, cache entries that have not been scanned to determine whether the write data could be from ransomware or other malware, as indicated by the scan flag 504, remain in the first cache $116_1$, and only cache entries for write data that have been scanned by the second control unit $104_2$ and not determined to comprise random data are destaged to the first storage $110_1$. Cache entries $500_i$ having write data 510 determined to potentially comprise malware are discarded from the first cache $116_1$ and may be moved to a quarantine location $130_1$.

The operations of FIG. 9 may also be performed in the second control unit $104_2$ by the cache manager $120_2$ to destage the copy of the write data from the second cache $116_2$ to the second storage $110_2$, and quarantine copies of write data determined to be malicious in the quarantine location $130_2$, so as not to overwrite a previous copy of valid data with the malicious write data. In this way, the second storage system maintains a valid copy of the data at the first storage $110_1$ from which data may be recovered if the first control unit $104_1$ destages malicious write data to the first storage $110_1$.

In an alternative embodiment, the cache manager $120_1$ may destage write data immediately after copying the write data to the second control unit $104_2$, without waiting for the results from the second control unit $104_2$ as to whether the write data has malicious data. This alternative embodiment avoids any delays in write processing at the first control unit $104_1$. In such an embodiment, if the second control unit $104_2$ determines that write data is malicious, after the first control unit $104_1$ has destaged the malicious write data to the first storage $110_1$, then the first control unit $104_1$ may recover the data overwritten by the malicious write data with the previous version of the data mirrored to the second storage $110_2$.

Figure 10:
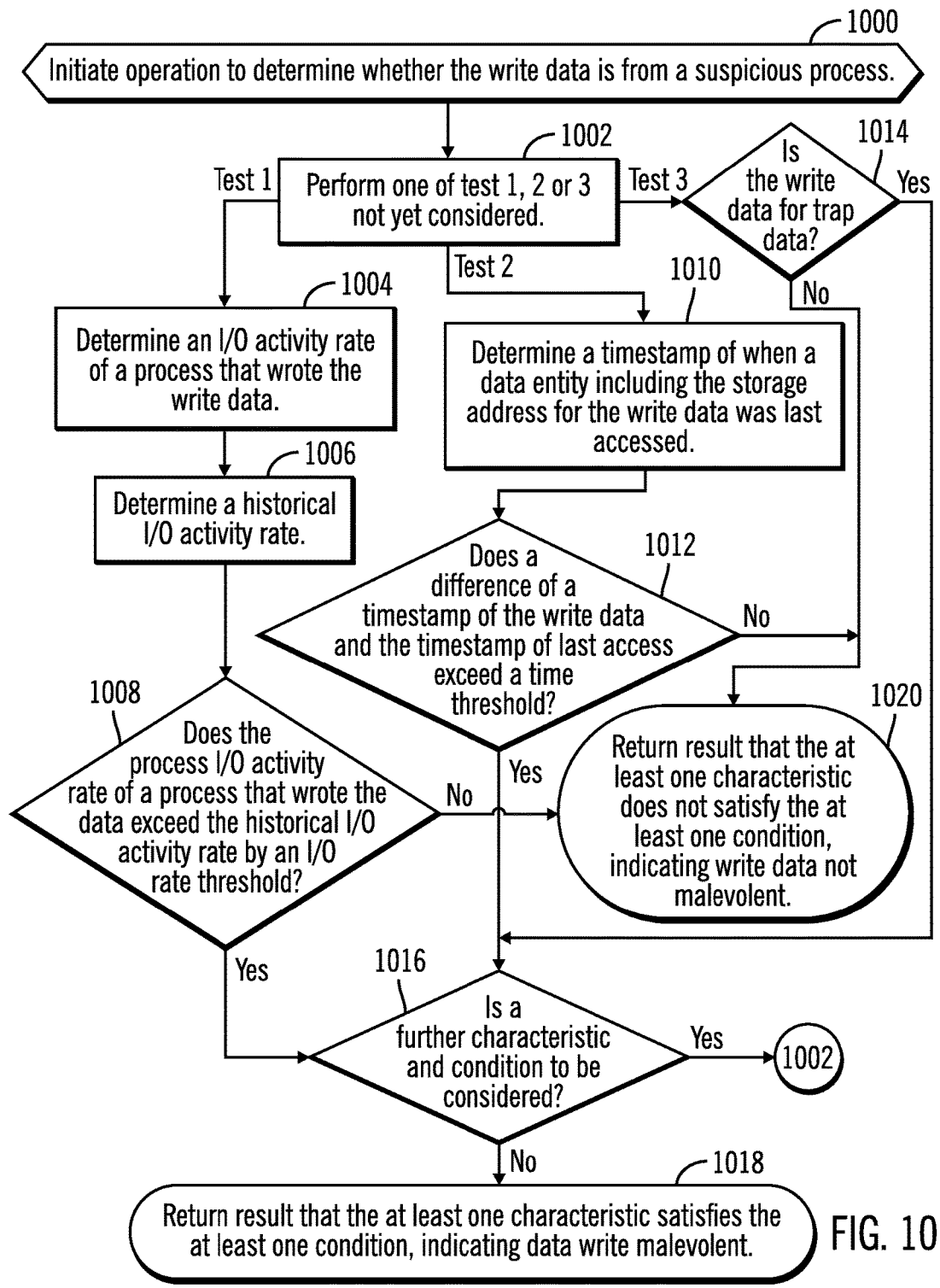
FIG. 10 illustrates an embodiment of operations to determine whether write data in cache is from a suspicious process.

FIG. 10 illustrates an embodiment of operations performed by the threat detector 124 in the second control unit $104_2$ to perform the operation at block 708 in FIG. 7 to determine whether the write data, based on the copy of the write data, is from a suspicious process. Upon initiating (at block 1000) the operation to determine whether the write data is from a suspicious process, the threat detector 124 may perform (at block 1002) any of the test 1, test 2 and/or test 3 from blocks 1004, 1010, and 1014 respectively, which make a determination of a suspicious process based on different characteristics of the write data and whether the characteristic satisfies a condition indicating a suspicious process. The three tests may be performed in any number and one or any number may be performed. Further, tests for suspicious process in addition to those shown in FIG. 10 may also be performed. In the embodiment of FIG. 10, a suspicious process is determined if all of the applied tests indicate the write data is from a suspicious process. If less than all the applied tests indicate the write data is from a suspicious process, then the process is not deemed suspicious. In an alternative embodiment, the write data may be determined to be from a suspicious process if only one of the applied tests or conditions for the different considered data characteristics indicates the write data is from a suspicious process.

Test 1 considers, as the characteristic of the data, an I/O activity rate of a process that wrote the data as compared to a historical I/O activity 300 for a time period 302 during which the write data was received, indicated in the copy of the first storage system data characteristics $122_2$. Under this test, a process is deemed suspicious if the process I/O activity exceeds historical I/O activity by a threshold. Such a test is based on the empirical observation that malicious code tends to perform a much larger amount of accesses of data, such as ransomware trying to encrypt all the data sets in a volume or a virus trying to corrupt or steal large amounts of data.

For test 1, the threat detector 124 determines (at block 1004) an I/O activity rate of a process that wrote the write data, where the I/O rate may comprise a transfer rate of accessing data, e.g., read or written, for a unit of time, e.g., megabytes or gigabytes per second. A determination is made (at block 1006) of a historical I/O activity rate. In one embodiment, the historical I/O activity rate may comprise an average peak I/O rate 304 for a time period 302 during which the write data was provided from the historical I/O activity instance $300_i$ for the determined time period. An I/O rate threshold or condition may comprise a standard deviation 306 for the determined peak I/O from peak I/O rates 206 measured during samples $200_i$ of the time period. If (at block 1008) the process I/O activity rate of the process that wrote the write data does not exceed the determined historical I/O activity rate by a threshold, such as a predetermined number of standard deviations 306, then the process is not considered suspicious, i.e., the condition for suspicious activity is not satisfied. If (at block 1008) the process I/O rate exceeds the determined peak I/O rate 304 by a threshold, such as a predetermined number of the determined standard deviation 306 for the average peak I/O rate 304 for the determined time period 302, then the process is identified (at block 512) as a suspicious process.

The first control unit $104_1$ may transmit information to the second control unit $104_2$ on process I/O activity, such as the I/O rate of processes, and the data the processes write, so that the second control unit $104_2$ may determine the I/O rate for a process that wrote the copied write data at block 1004. This information may be transferred with the copy of the first storage system data characteristics $122_2$.

Test 2 considers a last time a data entity 402, e.g., data set, group of tracks, etc., including the storage address to which the write data is directed was last accessed, such as a last write timestamp 406. A process is deemed suspicious if the write data is directed to a data entity 402 including the storage address that has not been accessed in a threshold time. This classification as suspicious is based on the empirical observation that malicious code tends to access all data, including data that has not been accessed in a long time, than non-malevolent processes. The threat detector 124 performs test 2 by determining (at block 1010) a timestamp of when the data entity including the storage address for the write data was last accessed. If (at block 1012) a difference of a timestamp of the write data and a timestamp of last access of the data entity including the storage address of the write data exceeds a time threshold, such as a write threshold, then the process that wrote the write data is identified as a suspicious process. Otherwise, if (at block 1012) the difference of when the data entity including storage address was last written does not exceed a threshold, i.e., is not too long, then control ends without the process writing the write being designated a suspicious process.

Test 3 considers whether the write data is directed to trap data 126, comprising data in the storage $110_1$ that is not accessed by valid users and would only likely be accessed by a malevolent process such as ransomware that tries to access all data in the storage $110_1$. The threat detector 124 performs test 3 by determining (at block 1014) whether the copy of the write data is directed to trap data 126 in the first storage $110_1$. If so, then the process that wrote the write data is deemed a suspicious process, and if the write data is not directed to trap data 126, then the process writing the write data is not considered suspicious.

The threat detector 124 determines (at block 1016) whether a further data characteristic is to be considered after determining that the process comprises a suspicious process after one of the tests (from the yes branch of block 1008, from the yes branch of block 1012 or from the yes branch of block 1014). If a further data characteristic is to be considered, then control proceeds to block 1002 to perform a test not yet performed. Otherwise, if all data characteristics have been considered and all the data characteristics satisfy a condition indicating the process writing the write data is suspicious, then the threat detector 124 returns (at block 1018) a result, such as at block 708 in FIG. 7, that the at least one characteristic satisfies the at least one condition, indicating the write data is from a suspicious process.

If for any of the tests, a determination was made that based on the considered data characteristic the process that wrote the write data is not suspicious (from the no branch of block 1008, the no branch of block 1012 or the no branch of block 1014), then the threat detector 124 returns (at block 1020) a result, such as at block 708 in FIG. 7, that the at least one characteristic does not satisfy the at least one condition, indicating the write data is not suspicious.

In the described embodiments of FIGS. 7 and 10, the threat detector 124 in the second control unit $104_2$ performs both determinations as to whether the process originating the write data is suspicious and whether the rite data is random data. In an alternative embodiment, the first control unit $104_1$ may determine whether a process that wrote the write data is suspicious and the second control unit $104_2$ determines whether the write data comprises random data, so that a determination of whether write data is malicious is based on considerations by both the first control unit $104_1$ and second control unit $104_2$.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computational components of FIG. 1, including the hosts $102_1$, $102_2$... $102_n$ and storage controller 104, may be implemented in one or more computer systems, such as the computer system 1102 shown in FIG. 11. Computer system/server 1102 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1102 may be practiced in distributed cloud computing environments where tasks are performed by remote processing devices that are linked through a communications network. In a distributed cloud computing environment, program modules may be located in both local and remote computer system storage media including memory storage devices.

Figure 11:
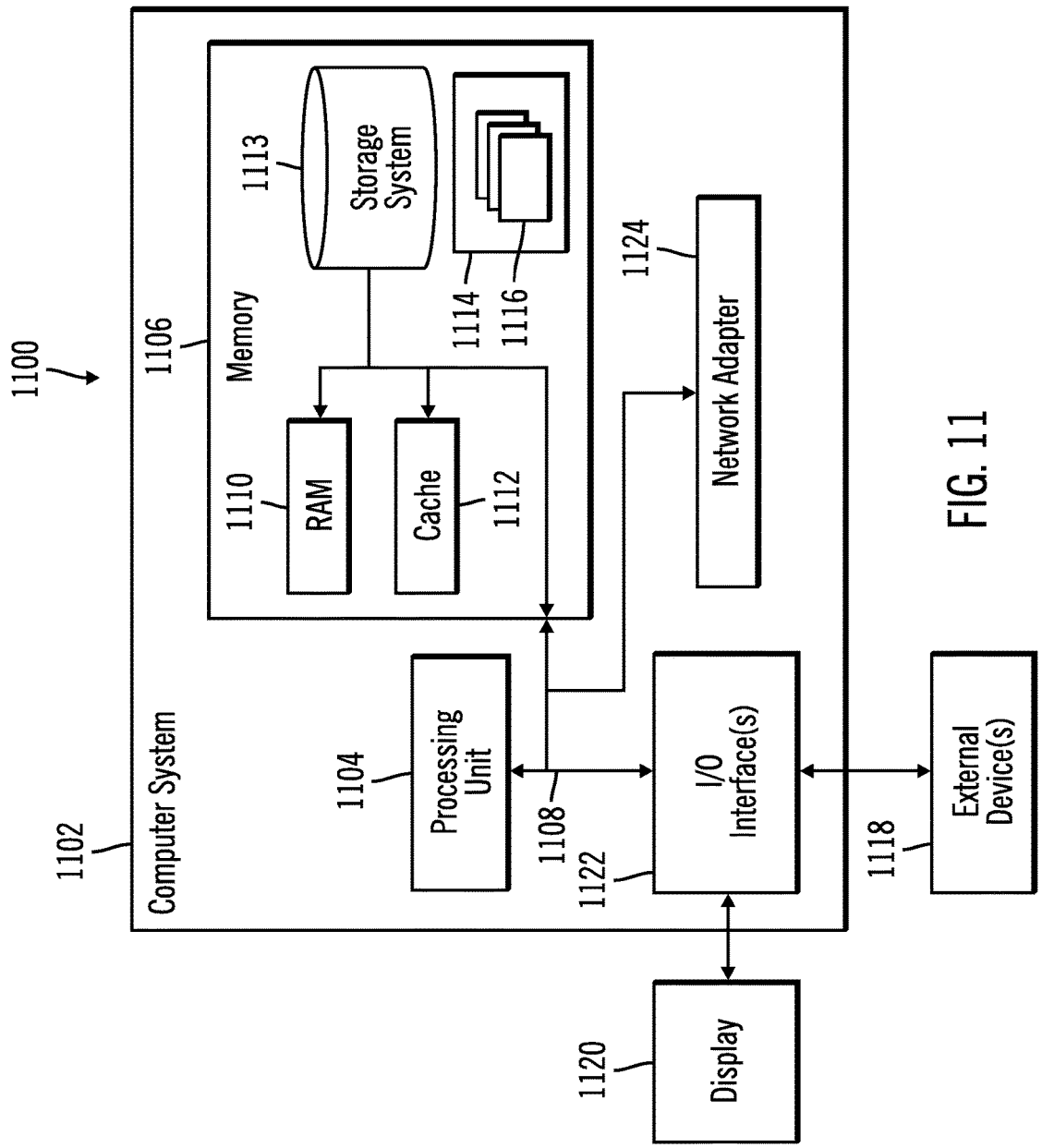
FIG. 11 illustrates a computing environment in which the components of FIG. 1 may be implemented

As shown in FIG. 11, the computer system/server 1102 is shown in the form of a general-purpose computing device. The components of computer system/server 1102 may include, but are not limited to, one or more processors or processing units 1104, a system memory 1106, and a bus 1108 that couples various system components including system memory 1106 to processor 1104. Bus 1108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1102 typically includes a variety of computer system readable media. Such media may be any available media that is accessible by computer system/server 1102, and it includes both volatile and non-volatile media, removable and non-removable media.

System memory 1106 can include computer system readable media in the form of volatile memory, such as random access memory (RAM) 1110 and/or cache memory 1112. Computer system/server 1102 may further include other removable/non-removable, volatile/non-volatile computer system storage media. By way of example only, storage system 1113 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided.

In such instances, each can be connected to bus 1108 by one or more data media interfaces. As will be further depicted and described below, memory 1106 may include at least one program product having a set (e.g., at least one) of program modules that are configured to carry out the functions of embodiments of the invention.

Program/utility 1114, having a set (at least one) of program modules 1116, may be stored in memory 1106 by way of example, and not limitation, as well as an operating system, one or more application programs, other program modules, and program data. Each of the operating system, one or more application programs, other program modules, and program data or some combination thereof, may include an implementation of a networking environment. The components of the computer 1102 may be implemented as program modules 1116 which generally carry out the functions and/or methodologies of embodiments of the invention as described herein. The systems of FIG. 1 may be implemented in one or more computer systems 1102, where if they are implemented in multiple computer systems 1102, then the computer systems may communicate over a network.

Computer system/server 1102 may also communicate with one or more external devices 1118 such as a keyboard, a pointing device, a display 1120, etc.; one or more devices that enable a user to interact with computer system/server 1102; and/or any devices (e.g., network card, modem, etc.) that enable computer system/server 1102 to communicate with one or more other computing devices. Such communication can occur via Input/Output (I/O) interfaces 1122. Still yet, computer system/server 1102 can communicate with one or more networks such as a local area network (LAN), a general wide area network (WAN), and/or a public network (e.g., the Internet) via network adapter 1124. As depicted, network adapter 1124 communicates with the other components of computer system/server 1102 via bus 1108. It should be understood that although not shown, other hardware and/or software components could be used in conjunction with computer system/server 1102. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for processing write data received at a first storage system and mirrored to a second storage system, the computer program product comprising a computer readable storage medium having computer readable program code embodied therein that when executed in a first storage system and second storage system performs operations, the operations comprising:
    caching write data for a first storage in a first cache in the first storage system;
    copying a copy of the write data in the first cache to a second cache in the second storage system;
    determining, at the second storage system, whether the write data in the first cache is from a suspicious process;
    determining, at the second storage system, whether the copy of the write data in the second cache comprises random data according to a randomness criteria in response to determining that the write data is from the suspicious process;
    returning, by the second storage system, a message to the first storage system indicating that the write data in the first cache comprises malicious data in response to determining the write data is from a suspicious process and the copy of the write data comprises random data or indicating that the write data does not comprise malicious data in response to determining the write data is not from a suspicious process or determining that the write data is from a suspicious process and the copy of the write data does not comprise random data;
    destaging, by the first storage system, the write data in the first cache to the first storage in response to the message indicating that the write data does not comprise malicious data; and
    processing, by the first storage system, the write data in the first cache as malicious data after determining from the message that the write data comprises malicious data.

2. The computer program product of claim 1, wherein the processing, by the first storage system, the write data as malicious data comprises performing at least one of discarding the write data from the first cache and copying the write data to a quarantine storage location for write data determined to be malevolent to be made available for further inspection.

3. The computer program product of claim 1, wherein the randomness criteria comprises a compression ratio, wherein the determining, by the second storage system, whether the copy of the write data in the second cache comprises random data comprises:
    compressing the copy of the write data to produce compressed write data; and
    determining whether the compressed write data exceeds the compression ratio, wherein the write data is determined to comprise random data in response to determining that the compressed write data does not exceed the compression ratio and wherein the write data is determined to not comprise random data in response to determining that the compressed write data exceeds the compression ratio.

4. The computer program product of claim 1, wherein the operations further comprise:
    indicating, by first storage system, that the write data has not been scanned when adding the write data to the first cache;
    indicating, by the first storage system, that the write data in the first cache was scanned and that the write data comprises malicious data in response to the message from the second storage system indicating that the write data comprises malicious data after the determining that the write data is from the suspicious process and that the write data comprises random data according to the randomness criteria; and
    indicating, by the first storage system, that the write data in the first cache was scanned and that the write data does not comprise malicious data in response to the message from the second storage system indicating that the write data does not comprise malicious data or determining that the write data is not from a suspicous process according to the randomness criteria.

5. The computer program product of claim 4, wherein the operations further comprise:
    selecting, by the first storage system, write data from a plurality of write data instances in the first cache; and
    determining, by the first storage system, whether the selected write data was scanned, wherein the selected write data is destaged in response to determining that the write data has been scanned and that the write data does not comprise malicious data, and wherein the selected write data is processed as malicious data in response to determining that the write data was scanned and comprises malicious data.

6. The computer program product of claim 1, wherein the determining, by the second storage system, whether the write data is from a suspicious process comprises:
    determining a characteristic of the write data in the first cache; and
    determining whether a characteristic of the write data satisfies a condition, wherein the write data is determined to be from a suspicious process in response to determining that the characteristic of the write data satisfies the condition.

7. The computer program product of claim 6, wherein the operations further comprise:
    transmitting to the second storage system, by the first storage system, information on characteristics of the first storage system that includes the characteristic of the write data, wherein the second storage system determines the characteristic of the write data from the information on the characteristics of the first storage system transmitted by the first storage system.

8. The computer program product of claim 6, wherein the characteristic of the write data comprises a process Input/Output (I/O) activity rate of a process that wrote the write data, wherein the determining, by the second storage system, whether the characteristic of the write data satisfies the condition comprises:
   determining a historical I/O activity rate for the write data; and
   determining whether the process I/O activity rate of a process that wrote the write data exceeds the historical I/O activity rate by a threshold, wherein the condition is satisfied in response to determining that the process I/O activity rate exceeds the threshold.

9. The computer program product of claim 6, wherein the characteristic of the write data comprises a timestamp of when a data entity including an address in the first storage for the write data was last accessed, wherein the determining, by the second storage system, whether the characteristic of the write data satisfies the condition comprises the second storage system determining whether a difference of a timestamp of the write data and the timestamp, of when the data entity including the address in the first storage system for the write data was last accessed, exceeds a threshold, wherein the condition is satisfied in response to determining that the difference exceeds the threshold.

10. The computer program product of claim 6, wherein the first storage stores trap data, wherein the characteristic of the write data comprises whether the write data is directed to the trap data in the first storage, and wherein the determining whether the characteristic of the write data satisfies the condition comprises determining whether the write data is directed to the trap data.

11. The computer program product of claim 1, wherein the write data is determined to be from a suspicious process in response to determining at least one of:
   that an Input/Output (I/O) activity rate of a process that wrote the write data exceeds a historical I/O activity rate by a I/O activity rate threshold,
   that a difference of a timestamp of the write data and the timestamp of when a data entity including the write data in the first storage was last written exceeds a time threshold, and
   that write data is directed to trap data.

12. A system comprising a first storage system in communication with a second storage system having a second cache and a second storage, comprising:
   a processor;
   a first cache;
   a first storage; and
   a computer readable storage medium having computer readable program code embodied therein that when executed by the processor performs operations, the operations comprising:
      caching write data for the first storage in the first cache in the first storage system;
      copying a copy of the write data in the first cache to the second cache in the second storage system;
      receiving, from the second storage system, a message indicating that the write data in the first cache comprises malicious data in response to the second storage system determining that the write data is from a suspicious process and that the copy of the write data comprises random data or indicating that the write data does not comprise malicious data in response to determining the write data is not from a suspicious process or determining that the write data is from a suspicious process and the copy of the write data does not comprise random data;
      destaging the write data in the first cache to the first storage in response to the message indicating that the write data does not comprise malicious data; and
      processing the write data in the first cache as malicious data after determining from the message that the write data comprises malicious data.

13. The system of claim 12, wherein the operations further comprise:
   indicating that the write data has not been scanned when adding the write data to the first cache;
   indicating that the write data in the first cache was scanned and that the write data comprises malicious data in response to the message from the second storage system indicating that the write data comprises malicious data after determining the write data comprises random data; and
   indicating that the write data in the first cache was scanned and that the write data does not comprise malicious data in response to the message from the second storage system indicating that the write data does not comprise malicious data.

14. The system of claim 13, wherein the operations further comprise:
   selecting write data from a plurality of write data instances in the first cache; and
   determining whether the selected write data was scanned, wherein the selected write data is destaged in response to determining that the write data has been scanned and that the write data does not comprise malicious data, and wherein the selected write data is processed as malicious data in response to determining that the write data was scanned and comprises malicious data.

15. A system comprising a second storage system in communication with a first storage system having a first cache and a first storage, comprising:
   a processor;
   a second cache;
   a second storage; and
   a computer readable storage medium having computer readable program code embodied therein that when executed by the processor performs operations, the operations comprising:
      receiving from the first storage system a copy of write data in the first cache;
      caching the copy of the write data in the second cache;
      determining, at the second storage system, whether the write data in the first cache is from a suspicious process;
      determining whether the copy of the write data in the second cache comprises random data according to a randomness criteria in response to determining that the write data is from the suspicious process; and
      returning a message to the first storage system indicating that the write data in the first cache comprises malicious data in response to determining that the write data is from the suspicious process and the copy of the write data comprises random data or indicating that the write data does not comprise malicious data in response to determining the write data is not from a suspicious processor or determining that the write data is from a suspicious process and the copy of the write data does not comprise random data, wherein the message causes the first storage system to destage the write data in the first cache to the first storage in response to the message indicating that the write data does not comprise malicious data and process the write data in the first cache as malicious data in response to the message indicating that the write data comprises malicious data.

16. The system of claim 15, wherein the randomness criteria comprises a compression ratio, wherein the determining whether the copy of the write data in the second cache comprises random data comprises:
compressing the copy of the write data to produce a compressed write data; and
determining whether the compressed write data exceeds the compression ratio, wherein the write data is determined to comprise random data in response to determining that the compressed write data does not exceed the compression ratio and wherein the write data is determined to not comprise random data in response to determining that the compressed write data exceeds the compression ratio.

17. The system of claim 15, wherein the write data is determined to be from a suspicious process in response to determining at least one of:
that an Input/Output (I/O) activity rate of a process that wrote the write data exceeds a historical I/O activity rate by a I/O activity rate threshold,
that a difference of a timestamp of the write data and the timestamp of when a data entity including the write data in the first storage was last written exceeds a time threshold, and
that write data is directed to trap data.

18. A method for processing write data received at a first storage system and mirrored to a second storage system, comprising:
caching write data for a first storage in a first cache in the first storage system;
copying a copy of the write data in the first cache to a second cache in the second storage system;
determining, at the second storage system, whether the write data in the first cache is from a suspicious process;
determining, at the second storage system, whether the copy of the write data in the second cache comprises random data according to a randomness criteria;
returning, by the second storage system, a message to the first storage system indicating that the write data in the first cache comprises malicious data in response to determining the write data is from a suspicious process and the copy of the write data and the copy of the write data comprises random data or indicating that the write data does not comprise malicious data in response to determining the write data is not from a suspicious process or determining that the write data is from a suspicious process and the copy of the write data does not comprise random data;
destaging, by the first storage system, the write data in the first cache to the first storage in response to the message indicating that the write data does not comprise malicious data; and processing, by the first storage system, the write data in the first cache as malicious data after determining from the message that the write data comprises malicious data.

19. The method of claim 18, wherein the randomness criteria comprises a compression ratio, wherein the determining, by the second storage system, whether the write data in the second cache comprises random data comprises:
compressing the write data to produce compressed write data; and
determining whether the compressed write data exceeds the compression ratio, wherein the write data is determined to comprise random data in response to determining that the compressed write data does not exceed the compression ratio and wherein the write data is determined to not comprise random data in response to determining that the compressed write data exceeds the compression ratio.

20. The method of claim 18, further comprising:
indicating, by first storage system, that the write data has not been scanned when adding the write data to the first cache;
indicating, by the first storage system, that the write data in the first cache was scanned and that the write data comprises malicious data in response to the message from the second storage system indicating that the write data comprises malicious data after determining the write data comprises random data according to the randomness criteria; and
indicating, by the first storage system, that the write data in the first cache was scanned and that the write data does not comprise malicious data in response to the message from the second storage system indicating that the write data does not comprise malicious data according to the randomness criteria.

21. The method of claim 20, further comprising:
selecting, by the first storage system, write data from a plurality of write data instances in the first cache; and
determining, by the first storage system, whether the selected write data was scanned, wherein the selected write data is destaged in response to determining that the write data has been scanned and that the write data does not comprise malicious data, and wherein the selected write data is processed as malicious data in response to determining that the write data was scanned and comprises malicious data.

22. The method of claim 20, wherein the write data is determined to be from a suspicious process in response to determining at least one of:
that an Input/Output (I/O) activity rate of a process that wrote the write data exceeds a historical I/O activity rate by a I/O activity rate threshold,
that a difference of a timestamp of the write data and the timestamp of when a data entity including the write data in the first storage was last written exceeds a time threshold, and
that write data is directed to trap data.

* * * * *